United States Patent
Furuhashi

[11] Patent Number: 5,870,184
[45] Date of Patent: Feb. 9, 1999

[54] OPTICAL PULSE TESTER

[75] Inventor: Masaaki Furuhashi, Tokyo, Japan

[73] Assignee: Ando Electric Co., Ltd., Tokyo, Japan

[21] Appl. No.: 953,806

[22] Filed: Oct. 9, 1997

[30] Foreign Application Priority Data

Oct. 9, 1996 [JP] Japan ................................ 8-268835

[51] Int. Cl.⁶ ............................................. G01N 21/84
[52] U.S. Cl. ............................................... 356/73.1
[58] Field of Search ................................... 356/73.1

[56] References Cited

U.S. PATENT DOCUMENTS 4,812,038  3/1989  Nazarathy et al. .................. 356/73.1
4,838,689  6/1989  Neumann ............................ 356/73.1

FOREIGN PATENT DOCUMENTS

Hei 4-158237  1/1992  Japan.

Primary Examiner—Robert Kim
Assistant Examiner—Tu T. Nguyen
Attorney, Agent, or Firm—Fish & Richardson P.C.

[57] ABSTRACT

The object of the present invention is to offer an optical pulse tester capable of accurately measuring waveforms of light returned from measured optical fibers even if the waveforms contain only discontinuous waveforms. An optical receiver 5 receives light returned from a measured optical fiber 10. An amplifying section 6 amplifies the level of the received light. A digital processing section 7 logarithmically converts the amplified received light level. A S/N ratio comparing means 11 compares the logarithmically converted value with a designated S/N ratio. A data storage means 12 stores received light levels having logarithmically converted values better than the designated S/N ratio, the position of the source of the returned light, and the designated gain value of the amplifying section 6. Thereafter, the procedure from the amplifying section 6 to the data storage means 12 is repeated while sequentially raising the gain of the amplifying section 12. Finally, a display section 8 corrects the level of the received light stored in the data storage means 12 based on the corresponding designated gain values which have been stored, and the data are displayed by joining them together in accordance with their corresponding positions which have been stored.

3 Claims, 6 Drawing Sheets

OPTICAL PULSE TESTER

BACKGROUND OF THE INVENTION

1. Field of the Invention

The present invention relates to an optical pulse tester (hereinafter referred to as an OTDR) for changing the gain of a measured circuit according to the S/N ratio of measurement results in order to obtain a measurement waveform having a desired S/N ratio.

2. Background Art

An OTDR sends an optical pulse through an optical directional coupler into an optical fiber being measured, then detects flaws and measures loss in the fiber or connection loss by detecting the returned optical pulse.

Next, the structure of a conventional OTDR shall be explained with reference to FIG. 7.

Figure 7:
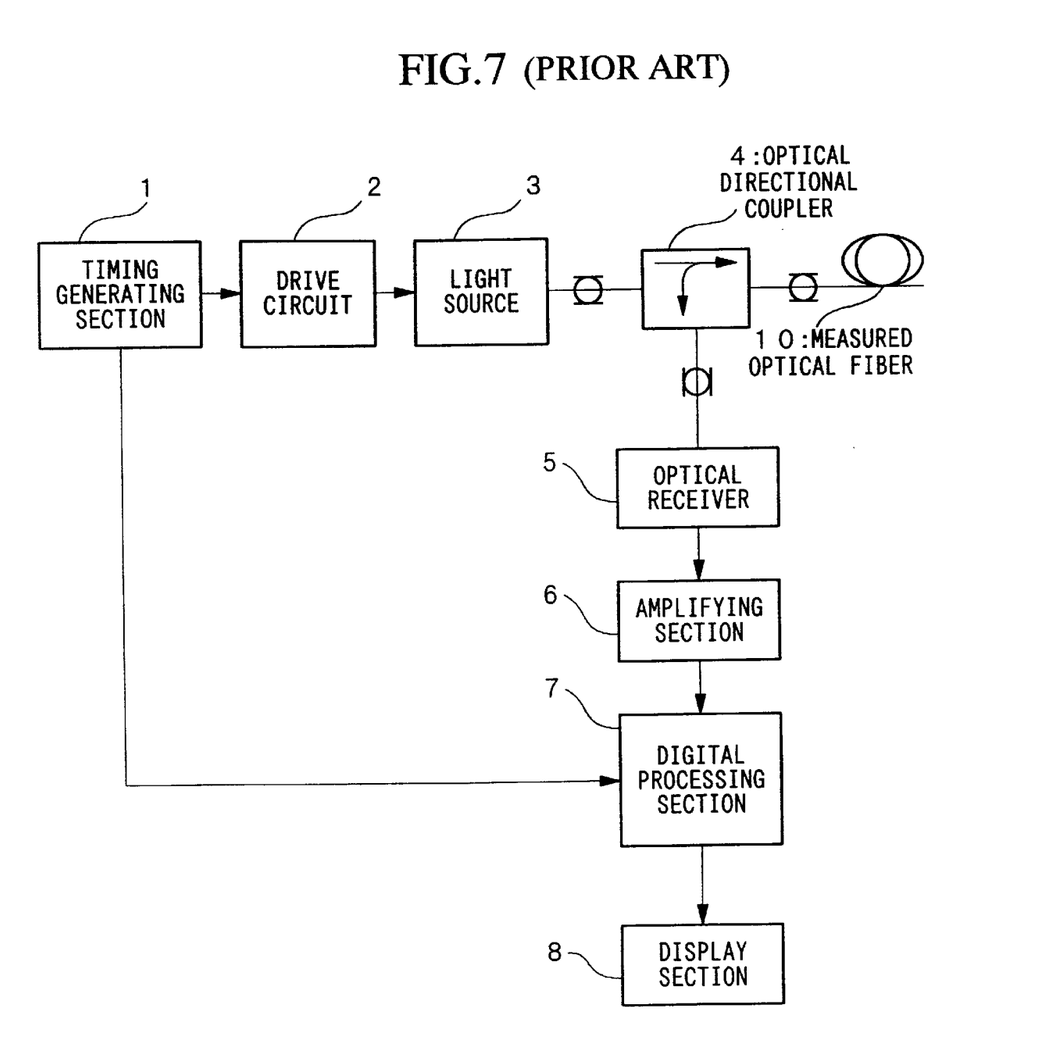
FIG. 7 is a block diagram showing an example of the structure of a conventional optical pulse tester.

In FIG. 7, reference numeral 1 denotes a timing generating section, reference numeral 2 denotes a drive circuit, reference numeral 3 denotes a light source such as a laser, reference numeral 4 denotes an optical directional coupler, reference numeral 5 denotes an optical receiver, reference numeral 6 denotes an amplifying section, reference numeral 7 denotes a digital processing section, reference numeral 8 denotes a display section, and reference numeral denotes a measured optical fiber which is the object of measurement.

With reference to FIG. 7, the drive circuit 2 releases a pulse current based on an electrical pulse from the timing generating section 1, to generate light from the light source 3. The optical pulse outputted from the light source 3 passes through the optical directional coupler and is incident on the measured optical fiber 10. The light returned from the measured optical fiber 10 such as back-scattered light or reflected light is sent from the optical directional coupler 4 to the optical receiver 5. The optical receiver 5 converts the optical signal into an electrical signal. The output of the optical receiver 5 is amplified by the amplifying section 6 and converted into a digital signal by the digital processing section 7, then is processed for noise reduction such as by averaging. Furthermore, the results have been logarithmically converted, then displayed on the display section 8.

In FIG. 7, the back-scattered light which returns from the measured optical fiber 10 is caused by Rayleigh scattering occurring within the measured optical fiber 10. The intensity level of this back-scattered light is lower than the incident optical pulse intensity by approximately 50 dBs, assuming that the measured optical fiber 10 is a normal single-mode fiber and the optical pulse width of the incident light is $1 \times 10^{-6}$ seconds long. In order to handle such a weak signal, the apparatus shown in FIG. 7 repeatedly measures the back-scattered light and takes the average value in order to improve the S/N ratio. The digital processing section 7 is provided for this reason.

Figure 8:
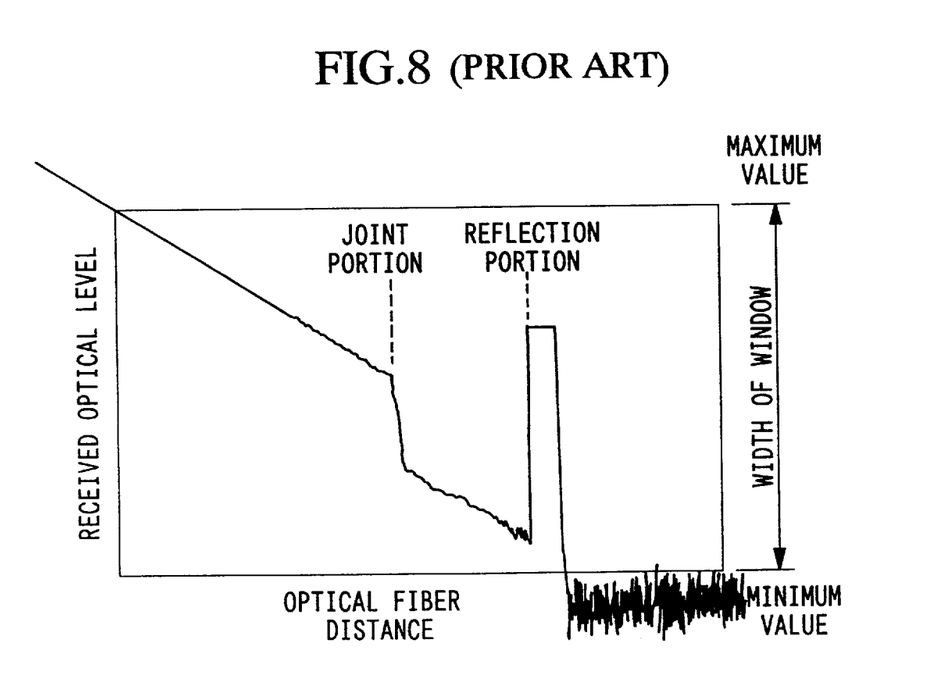
FIG. 8 is a graph showing an example of a measured waveform of a conventional optical pulse tester.

Next, a measured waveform from a conventional OTDR shall be explained with reference to FIG. 8. FIG. 8 shows a case wherein two different optical fibers are connected and these are measured as the measured optical fiber 10. The horizontal axis denotes the optical fiber length (the time after the optical pulse has been emitted by the light source 3 and directed to the measured optical fiber 10), and the vertical axis denotes the received optical intensity level.

As shown in FIG. 8, the measured waveform exhibits a straight line which decreases toward the right due to logarithmic conversion by the digital processing section 7. Additionally, the loss at the junction portion of the two optical fibers is shown as a downward step, and reflection at the connectors and reflection at the terminal points are observed as a large discontinuous upward wave.

The maximum value of the window shown in FIG. 8 is the maximum value inputted into the digital processing section 7 at a certain gain designated by the amplifying section 6, and the minimum value of the window shown in FIG. 8 is the value of noise at the input end of the digital processing section 7 due to the light received from the measured optical fiber 10 being so weak as to be lost in the noise of the optical receiver 5. As shown in this drawing, in a conventional OTDR, when the received light level is high and close to the maximum value, the S/N ratio is good and a clean waveform is observed; conversely, when the received light level is low, the S/N ratio is poor and noise is superimposed onto the observed waveform so as to result in a widely spread waveform. Additionally, with regard to FIG. 8, the width of the window of observation (maximum value to minimum value) may be considered to be the measurement range of common circuit testers. For this reason, when the received light level exceeds the maximum value of the window and the measurable range is exceeded, then the tester is set to a higher range, and when the received light level is low and the measured value is extremely small with respect to the range, then the tester is set to a lower range in order to take measurements. In this case, when the level changes greatly on the time axis as with the received waveform of an OTDR, the received waveform only rarely fits inside the window in a single measurement. Therefore, the measurements must be taken while switching the measurement range many times.

The applicant has filed a patent application for an OTDR which resolves these problems (see Japanese Patent Application, First Publication No. Hei 4-158237). Hereinbelow, this OTDR shall be described briefly.

The OTDR has a pre-designated S/N ratio, and comprises S/N ratio comparing means for comparing the received light level which has been logarithmically converted (corresponding to the output of the digital processing section 7 in FIG. 7) with the pre-designated value, and data storage means for storing the received light level. The received light levels at the portions where the logarithmically converted received light levels are better than the pre-designated value (pre-designated S/N ratio) are stored in the data storage means. With regard to the portions at which the received light levels are worse than the pre-designated value, comparison and storage are repeated while improving the S/N ratio by increasing the gain of the amplifying portion, or improving the S/N ratio by increasing the number of times the back-scattered light is added in order to find the mean value. Finally, the data stored in the data storage means are joined together and displayed.

However, the above-described OTDR (described in Japanese Patent Application, First Publication No. Hei 4-158237) leaves a problem in that when the data is ultimately joined together, the received light levels of the data are difficult to join together because the standards by which the received light levels of the data are to be joined together are not clear from only the contents stored in the data storage means.

That is, since the data storage means stores only the received light levels at each distance, when joining together data with the above-described OTDR, the mutual received light levels must be adjusted such that the received light levels are matched and vary smoothly at the joint portions of the waveforms between adjacent data areas. Consequently, a problem remains in that when adjacent data does not exist, the received light levels of the data are not capable of being decided.

SUMMARY OF THE INVENTION

The present invention has the object of offering an optical pulse tester capable of making accurate measurements in a shorter time, in an optical pulse tester which has a constant S/N ratio for the measured waveforms and shorter measurement times due to the provision of S/N ratio comparing means and storage means.

The present invention offers an optical pulse tester, comprising an optical fiber to be analyzed; a light source for outputting a designated optical pulse; an optical directional coupler for directing an optical pulse outputted by the light source into the optical fiber and emitting return light from positions inside the optical fiber; an optical receiver for receiving return light emitted by the optical directional coupler and outputting a received optical intensity; an amplifying section for amplifying the optical intensities received by the optical receiver; a processing section for logarithmically converting the optical intensities amplified by the amplifying section; comparison means for comparing logarithmically converted values of the processing section with a predesignated S/N ratio; storage means for storing an optical intensity, a position inside the optical fiber, and a gain of the amplifying section corresponding to the respective optical intensities for which the logarithmically converted values have an S/N ratio better than the predesignated S/N ratio as a result of comparison by the comparing means; repetition means for controlling the amplifying section, the processing section, the comparing means and the storage means to repeat their procedures while raising the gain of the amplifying section by predetermined amounts, until the gain of the amplifying section is maximized, and display means for correcting the optical intensities stored in the storage means based on the corresponding gains stored in the storage means, and displaying the results by joining the optical intensities in the order of their positions stored in the storage means.

Additionally, in the present invention, it is favorable for the processing section to convert the optical intensities amplified by the amplifying section into digital signals, adds and averages the digital signals, and logarithmically converts the results of averaging.

Additionally, in the present invention, it is favorable for the storage means not to store the optical intensities, positions and gains corresponding to positions for which the optical intensities, positions and gains have already been stored in the storage means due to the repetition procedure of the repetition means, among the positions inside the optical fiber corresponding to optical intensities having logarithmically converted values with S/N ratios better than the predesignated S/N ratio as a result of the comparison of the comparison means.

According to this invention, the measured waveforms are waveforms wherein only the reflected waveforms (discontinuous waveforms) exist discretely, as a result of which each received light level can be accurately adjusted to the correct level, even when joint portions of the waveforms do not exist between adjacent data among the data which are stored by separation into a plurality of pieces, thereby allowing measured waveforms with constant S/N ratios over the entire range to be obtained.

DESCRIPTION OF PREFERRED EMBODIMENTS OF THE INVENTION

Hereinbelow, embodiments of the present invention shall be explained with reference to the drawings.

Figure 1:
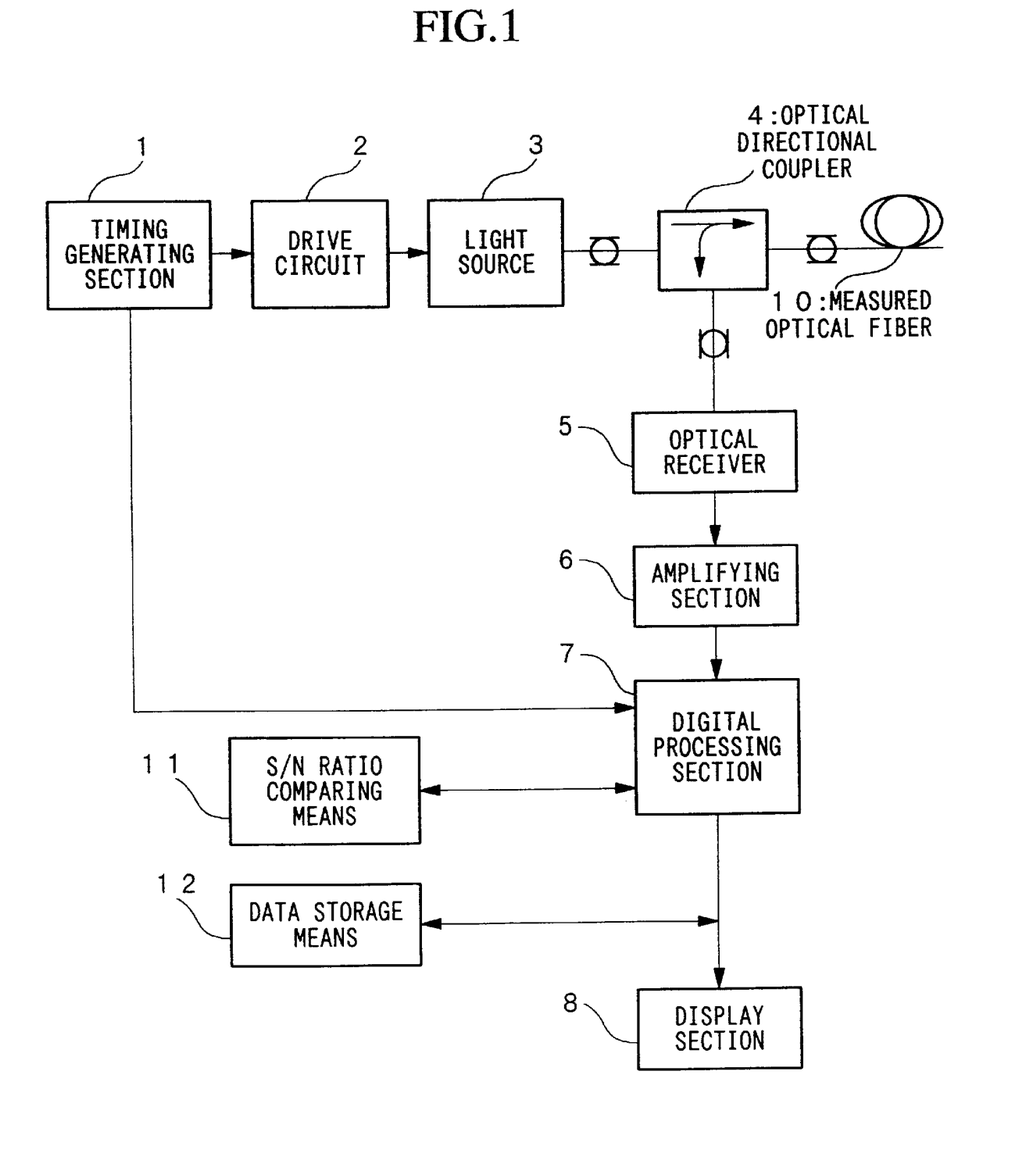
FIG. 1 is a block diagram showing an example of the structure of an optical pulse tester according to an embodiment of the present invention.

FIG. 1 is a block diagram showing an example of the structure of an optical pulse tester (OTDR) according to an embodiment of the present invention. In this drawing, the parts which correspond to the various parts shown in FIG. 7 are given the same reference numerals and their explanations are omitted. In the OTDR shown in this drawing, an S/N ratio comparing means 11 and a data storage means 12 are added.

This apparatus sends data logarithmically converted by the digital processing section 7 to the S/N ratio comparing means 11, then compares the values with designated values preset in the S/N ratio comparing means 11. Since it is rare for the S/N ratio of all of the data to exceed the designated value, the portions of the data with an S/N ratio better than the designated value are selected, and distance information (the time after the optical pulse has been emitted by the light source 3 and directed to the measured optical fiber 10) and reception levels of these portions, and the designated gain value of the amplifying section 6, are sent to the data storage means 12 for storage.

Additionally, with regard to the portions at which the S/N ratio is worse than the designated value in the S/N ratio comparing means 11, the reception level is raised by increasing the gain of the amplifying section 6, and the S/N ratio is made better than the designated value in the S/N ratio comparing means 11. Then, although the reception levels of the previously stored data will become too high and exceed the maximum value of input into the digital processing section 7, since the data of these portions have already been stored, the distance information, reception level and designated gain values in the amplifying section 6 are sent to the data storage means 12 for storage with respect to only the portions wherein the S/N ratios have newly exceeded the designated value.

Thereafter, an averaging process is continued in the same manner by sending data with S/N ratios better than the designated value to the storage means for storage and increasing the gain of the amplifying section 6 further with respect to data with S/N ratios worse than the designated value.

The window obtained when the gain has been maximized as a result of raising the gain of the amplifying section 6 exhibits the state of maximum sensitivity of the OTDR, in which case the distance information, reception level and designated gain of the amplifying section with respect to all of the portions inside the effective window are sent to the data storage means 12 for storage. In this case, the maximum value of the window is the maximum input value of the digital processing section 7 at the maximum gain designated at the amplifying section 6. Additionally, the minimum value of the window in this case is the value of the noise at the input end of the digital processing section, because the light received from the measured optical fiber 10 is so weak as to be lost in the noise of the optical receiver 5.

Finally, the data stored in the data storage means 12 are rearranged in accordance with the distance information, reception level and designated gain value in order to result in a single set of measured data.

Figure 2:
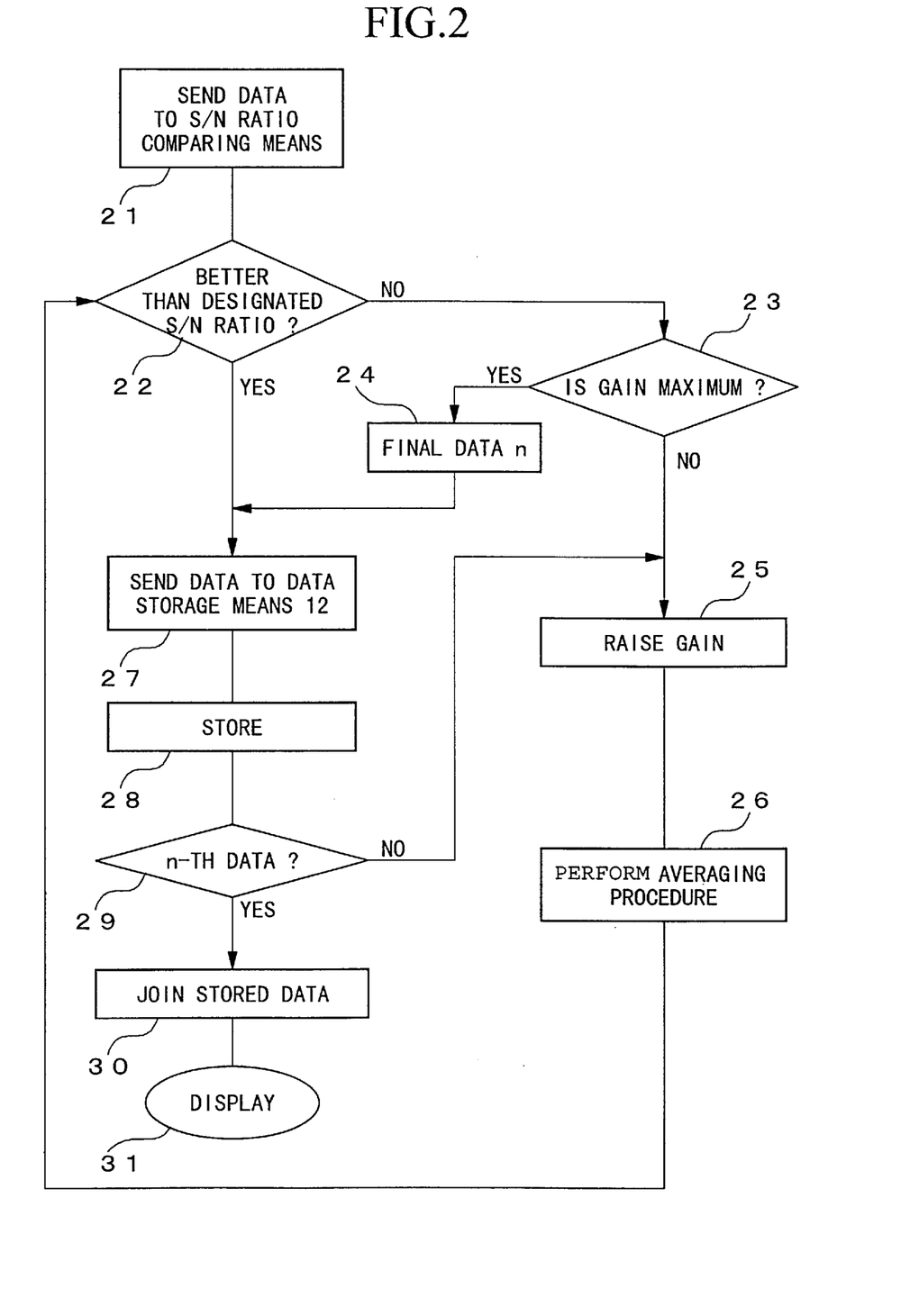
FIG. 2 is a flow chart showing an example of the operations of an optical pulse tester according to an embodiment of the present invention.

Next, the operations of an OTDR having the above-described structure shall be explained with reference to the drawings. FIG. 2 is a flow chart showing an example of the operations of the OJDR according to the present embodiment.

First, at step 21, the data in the digital processing section 7 is sent to the S/N ratio comparing means 11. At step 22, the data outputted from the digital processing section 7 is compared with the designated value set in the S/N ratio comparing means.

If the data outputted from the digital processing section 7 (S/N ratio) is worse than the designated value, then the procedure advances to step 23.

In step 23, it is determined whether or not the gain of the amplifying section 6 is maximum, and if the gain is maximum, the current data is set to be the final data n in step 24 in order to perform averaging for the final window.

If the gain of the amplifying section 6 is determined not to be maximum in step 23, then the procedure advances to step 25. In step 25, the gain of the amplifying section 6 is increased. Next, in step 26, averaging is performed in the digital processing section 7, and the procedure is returned to step 22.

On the other hand, in step 22, if the data outputted from the digital processing section 7 (the S/N ratio) is better than the designated value, then the procedure advances to step 27.

In step 27, the data is sent to the data storage means 12. Next, in step 28, the received data is stored in the data storage means 12.

In step 29, it is determined whether or not the current data is the n-th data (final data n). The procedure advances to step 30 if the data is the final data n, and if not, advances to step 25.

In step 30, the data in the data storage means 12 is rearranged in accordance with the distance information, the reception level and the designated gain value, so as to form a single piece of measurement data. Then, in step 31, the completed data is displayed on display section 8.

Next, the measured waveform of the OTDR after averaging has been performed at the digital processing section 7 and a logarithmic conversion has been made shall be explained in FIGS. 3–6.

Figure 3:
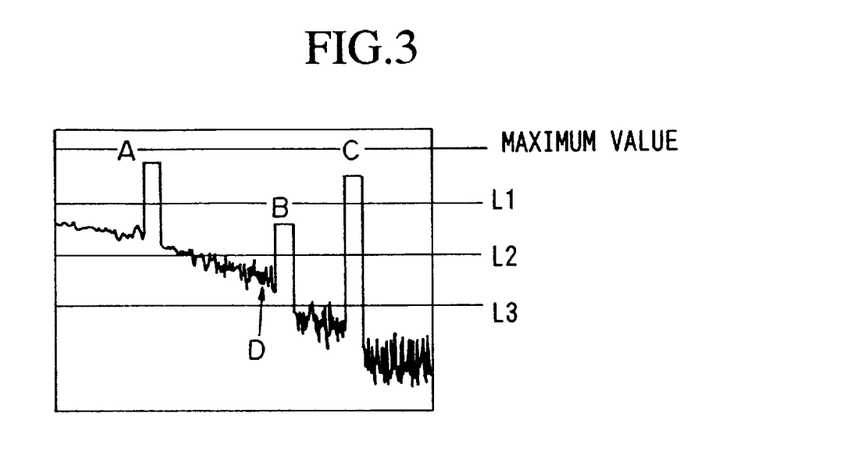
FIG. 3 is a graph showing an example of a measured waveform of an optical pulse tester according to an embodiment of the present invention.

FIG. 3 is a graph showing an example of a measured waveform for an OTDR according to the present invention. In this drawing, the designated value in the S/N ratio comparing means 11 is set at a value 5 dBs less than the maximum value of the window, and is indicated by the line L1. Of the discontinuous waveforms A, B and C in FIG. 3, the portions which exceed the designated value (line L1) of the S/N ratio comparing means 11 are sent to the data storage means 12, and the distance information, reception levels and designated gain value of the amplifying section 6 for those portions are stored together.

Additionally, the line L2 in FIG. 3 indicates the level 5 dBs less than line L1. When the gain of the amplifying section 6 is increased by 5 dBs to make the reception signal stronger, an averaging process is performed by the digital processing section 7, and a logarithmic conversion is performed, the measured waveform of FIG. 4 is obtained.

Figure 4:
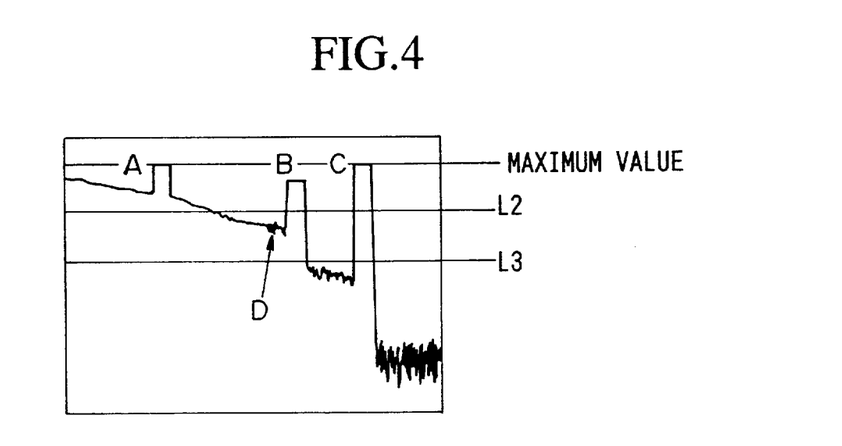
FIG. 4 is a graph showing an example of a measured waveform of an optical pulse tester according to an embodiment of the present invention.

In FIG. 4, line L1 is the maximum value of the window, and line L2 is observed to be 5 dBs less than the maximum value of the window. If the designated value of the S/N ratio comparing means 11 is set at a value 5 dBs less than the maximum value of the window as with FIG. 3, the data in the vicinity of the discontinuous waveform A and the data for the discontinuous waveform B are sent to the data storage means 12, and the distance information, reception level and designated gain value at the amplifying section 6 of those portions are stored together. However, since the portions which exceed L1 (the maximum value) have already been stored, there is no need to store them at this time.

Figure 5:
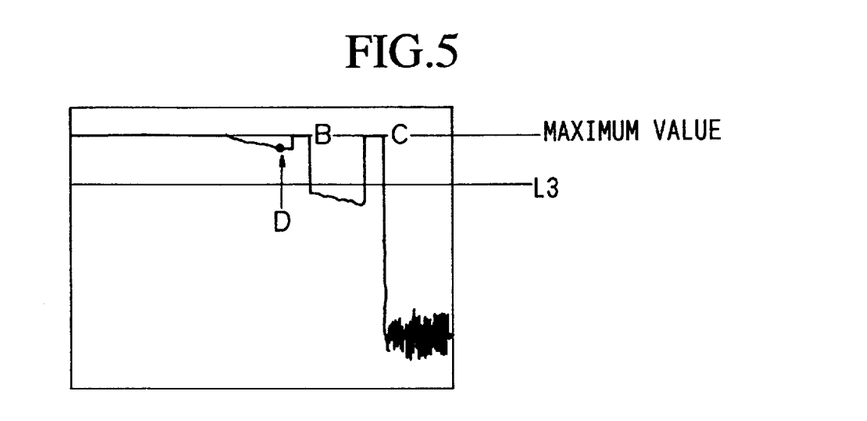
FIG. 5 is a graph showing an example of a measured waveform of an optical pulse tester according to an embodiment of the present invention.

Line L3 in FIG. 4 indicates a level 5 dBs less than line L2. When the gain in the amplifying section 6 is increased by 5 dBs to make the reception signal stronger, averaging is performed by the digital processing section 7 and a logarithmic conversion is performed, the measured waveform of FIG. 5 is obtained. In FIG. 5, line L2 is the maximum value of the window, and line L3 is observed to be 5 dBs less than the maximum value of the window. When the designated value of the S/N ratio comparing means 11 is set at a value 5 dBs less than the maximum value of the window as with FIGS. 3 and 4, data for the waveform portion containing point D is sent to the data storage means 12, and the distance information, reception level and designated gain value of the amplifying section 6 for that portion are stored together. However, since the portions exceeding L2 (the maximum value) have already been stored, there is no need to store them at this time.

Thereafter, the same procedure is repeated until the gain of the amplifying section 6 achieves the maximum gain.

Figure 6:
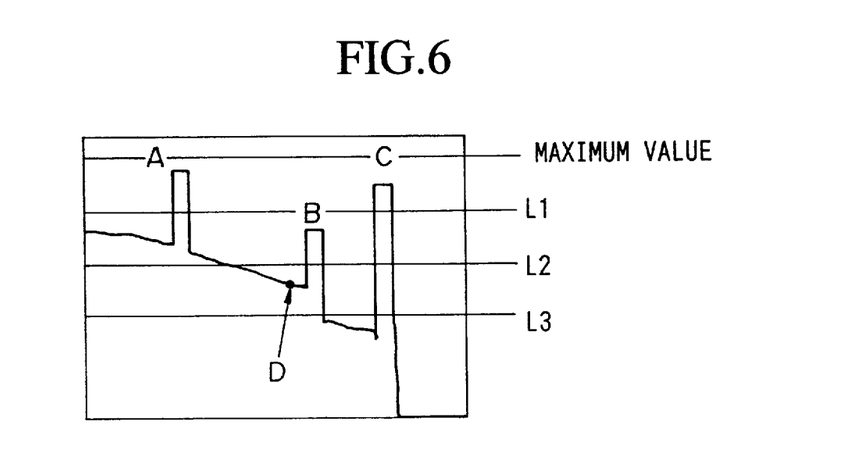
FIG. 6 is a graph showing an example of a measured waveform of an optical pulse tester according to an embodiment of the present invention.

Finally, the data stored in the data storage means 12 is arranged vertically from those with higher reception levels, among the discontinuous waveforms A, B, C, then the portion containing point D. At this time, the received light levels obtained as a result of raising the gain of the amplifying section 6 are corrected based on the designated gain values stored with the data. Additionally, they are arranged horizontally in accordance with the distance information. Then, these are joined together as a single piece of data and displayed on the display section 8 as shown in FIG. 6.

While embodiments of the present invention have been described above with reference to the drawings, the specific structure is not limited to these embodiments, and any variations in design within a range such as not to contradict the spirit of the present invention are also included within the scope of the invention.

The invention claimed is:

1. A light return loss measurement system comprising:
   a light source for outputting a designated optical pulse;
   an optical directional coupler for directing an optical pulse outputted by said light source into an optical fiber to be analyzed and emitting return light from positions inside said optical fiber;
   an optical receiver for receiving return light emitted by said optical directional coupler and outputting a received optical intensity;

an amplifying section for amplifying the optical intensities received by said optical receiver;

a processing section for logarithmically converting the optical intensities amplified by said amplifying section;

comparison means for comparing logarithmically converted values of said processing section with a predesignated S/N ratio;

storage means for storing an optical intensity, a position inside said optical fiber, and a gain of said amplifying section corresponding to the respective optical intensities for which the logarithmically converted values have an S/N ratio better than the predesignated S/N ratio as a result of comparison by said comparing means;

repetition means for controlling said amplifying section, said processing section, said comparing means and said storage means to repeat their procedures only a number of times while raising the gain of said amplifying section by predetermined amounts, until the gain of said amplifying section is maximized, wherein the number of times is based on a maximum value of a processing range for the processing system and a maximum value of the gain of the amplifying system; and display means for correcting the optical intensities stored in said storage means based on the corresponding gains stored in said storage means, and displaying the results by joining the optical intensities in the order of their positions stored in said storage means.

2. A light return loss measurement system according to claim 1, wherein said processing section converts the optical intensities amplified by said amplifying section into digital signals, adds and averages the digital signals, and logarithmically converts the results of averaging.

3. A light return loss measurement system according to either claim 1 or claim 2, wherein said storage means does not store the optical intensities, positions and gains corresponding to positions for which the optical intensities, positions and gains have already been stored in said storage means due to the repetition procedure of said repetition means, among the positions inside said optical fiber corresponding to optical intensities having logarithmically converted values with S/N ratios better than said predesignated S/N ratio as a result of the comparison of said comparison means.

* * * * *